(12) United States Patent
Bennett et al.

(10) Patent No.: US 9,167,826 B1
(45) Date of Patent: *Oct. 27, 2015

(54) PROCESS FOR MAKING HIGH-PROTEIN DAIRY PRODUCT

(71) Applicant: Twin Cups, LLC, Santa Barbara, CA (US)

(72) Inventors: Craig Bennett, Draper, UT (US); Nathan Carey, Santa Barbara, CA (US); Jacob Israelachvili, Santa Barbara, CA (US)

(73) Assignee: Twin Cups, LLC, Santa Barbara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/699,433

(22) Filed: Apr. 29, 2015

Related U.S. Application Data

(63) Continuation of application No. 14/270,536, filed on May 6, 2014, now Pat. No. 9,040,107.

(60) Provisional application No. 61/897,086, filed on Oct. 29, 2013.

(51) Int. Cl.
| | |
|---|---|
| *A23C 9/12* | (2006.01) |
| *A23C 9/13* | (2006.01) |
| *A23C 9/123* | (2006.01) |
| *A23C 9/00* | (2006.01) |
| *A23C 21/00* | (2006.01) |
| *A23C 9/154* | (2006.01) |
| *A23C 9/15* | (2006.01) |

(52) U.S. Cl.
CPC ................ *A23C 9/1307* (2013.01); *A23C 9/00* (2013.01); *A23C 9/12* (2013.01); *A23C 9/123* (2013.01); *A23C 9/15* (2013.01); *A23C 9/1544* (2013.01); *A23C 21/00* (2013.01)

(58) Field of Classification Search
CPC .............. A23C 9/00; A23C 9/02; A23C 9/12; A23C 9/123; A23C 9/1307; A23C 9/15; A23C 9/1544; A23C 21/00; A23V 2250/4252
USPC ......... 426/34, 41, 42, 43, 520, 521, 522, 580, 426/583
See application file for complete search history.

(56) References Cited

U.S. PATENT DOCUMENTS

| | | | | |
|---|---|---|---|---|
| 6,183,802 | B1 * | 2/2001 | Silva et al. | 426/580 |
| 9,040,107 | B2 * | 5/2015 | Bennett et al. | 426/43 |

* cited by examiner

*Primary Examiner* — Leslie Wong
(74) *Attorney, Agent, or Firm* — SoCal IP Law Group LLP; Steven C. Sereboff; Guy L. Cumberbatch (57) ABSTRACT

A dairy-based yogurt product having a protein level above 15%, sometimes more than 25%, with a smooth and rich texture and no grittiness. The yogurt product includes a particular selection of dairy proteins and other ingredients to raise the gelation temperature of the dairy proteins and avoid causing gelation or precipitation during pasteurization. Additionally, pasteurization temperatures, times and methods are selected to avoid gelation. Starting dairy proteins generally have relatively higher pH levels and low total acidity (TA) levels to help reduce gelation during pasteurization. Ingredients such as buffering agents and sequestering agents may be utilized to help raise the gelation temperature, as well as higher sugar levels which can control hydration of the proteins.

30 Claims, 12 Drawing Sheets

Figure 3 - table listing preferred ingredients and their properties for forming an exemplary culture batch

- Batch Size = 4410

| Order | Ingredients | Raw Ingredient Info | | | Formula Info | | Culture Info | | | |
|---|---|---|---|---|---|---|---|---|---|---|
| | | % Fat | % Protein | % T.S. | % By Wt. | LB's/Batch | % Fat | % Protein | % T.S. | Gallons |
| 2 | Skim Milk Powder | 0.65 | 36.00 | 96.00 | 9.000 | 396.90 | 0.059 | 3.240 | 8.640 | |
| 2 | Dextrose | 0.00 | 0.00 | 98.00 | 0.500 | 22.05 | 0.000 | 0.000 | 0.490 | |
| 2 | Deoiled Sunflower Lecithin | 80.00 | 1.00 | 95.00 | 0.100 | 4.41 | 0.080 | 0.001 | 0.095 | |
| 3 | Whey Protein Concentrate | 7.00 | 80.00 | 95.50 | 5.500 | 242.55 | 0.385 | 4.400 | 5.253 | |
| 3 | Whey Protein Isolate | 0.3 | 94.00 | 95.30 | 0.50 | 22.05 | 0.002 | 0.470 | 0.477 | |
| 2 | Trisodium Citrate | 0.00 | 0.00 | 98.00 | 0.100 | 4.41 | 0.000 | 0.000 | 0.098 | |
| 4 | ABY-2C Culture, Danisco/Dupont | | | | * | * | | | | |
| 1 | Water | 0.00 | 0.00 | 0.00 | 84.300 | 3717.63 | 0.000 | 0.000 | 0.000 | 445.225 |
| | | | | Totals: | 100.000 | 4410.00 | 0.525 | 8.111 | 15.052 | 500.000 |

* Note, culture addition is based on batch size - 375DCU ABY-2C (57.0 g's) is for 500 gallons
(DCU = Danisco Culture Units - a measure of the activity of the cultures, ABY-2C is a type of culture)

Figure 4

Figure 5 - table listing preferred ingredients and their properties for forming an exemplary high-protein dairy base mix,
- Batch Size = 1990

| Order | Ingredients | Raw Ingredient Info | | | Formula Info | | Base Mix Info | | | |
|---|---|---|---|---|---|---|---|---|---|---|
| | | % Fat | % Protein | % T.S. | % By Wt. | LB's/Batch | % Fat | % Protein | % T.S. | Gallons |
| 1 | Water | 0.00 | 0.00 | 0.00 | 54.070 | 1075.99 | 0.000 | 0.000 | 0.000 | 128.861 |
| 5 | Heavy Cream | 43.5 | 2.6 | 48.2 | 0.800 | 15.92 | 0.348 | 0.021 | 0.386 | 1.855 |
| 2 | Cane Sugar | 0.00 | 0.00 | 99.80 | 8.500 | 169.15 | 0.000 | 0.000 | 8.483 | |
| 2 | Dextrose, Granulated | 0.00 | 0.00 | 99.00 | 2.800 | 55.72 | 0.000 | 0.000 | 2.772 | |
| 2 | Trisodium Citrate | 0.00 | 0.00 | 98.00 | 0.100 | 1.99 | 0.000 | 0.001 | 0.098 | |
| 2 | Deoiled Sunflower Lecithin | 80.00 | 1.00 | 95.00 | 0.100 | 1.99 | 0.080 | 0.000 | 0.095 | |
| 2 | Sodium Tri-polyphosphate | 0.00 | 0.00 | 98.00 | 0.110 | 2.19 | 0.000 | 0.000 | 0.108 | |
| 2 | Inulin | 0.00 | 0.00 | 90.00 | 4.000 | 79.60 | 0.000 | 0.000 | 3.600 | |
| 2 | Stevia Extract | 0.00 | 0.00 | 97.00 | 0.020 | 0.40 | 0.000 | 0.000 | 0.019 | |
| 6 | Skim Milk Powder | 0.65 | 36.00 | 96.00 | 3.800 | 75.62 | 0.025 | 1.368 | 3.648 | |
| 4 | Whey Protein Isolate | 0.3 | 94.00 | 95.30 | 0.50 | 9.95 | 0.002 | 0.470 | 0.477 | |
| 3 | Whey Protein Concentrate | 7.00 | 80.00 | 95.50 | 25.200 | 501.48 | 1.764 | 20.160 | 24.066 | |
| | | | | Totals: | 100.000 | 1990.00 | 2.218 | 22.020 | 43.751 | 200.000 |

Figure 6 - table listing preferred proportions of ingredients in an exemplary final mix including the culture batch and base mix along with flavoring ingredients to produce vanilla yogurt

- Batch Size = 2300

| Order | Ingredients | Ingredient Info | | | Finished Mix Formula | | Finished Mix Info | | | |
|---|---|---|---|---|---|---|---|---|---|---|
| | | % Fat | % Protein | % T.S. | % By Wt. | LB's/Batch | % Fat | % Protein | % T.S. | Gallons |
| 2 | Fermented Culture Blend | 0.53 | 8.11 | 15.05 | 13.580 | 312.34 | 0.071 | 1.101 | 2.044 | 34.570 |
| 1 | Base Mix | 2.22 | 22.02 | 43.75 | 86.000 | 1978.00 | 1.908 | 18.937 | 37.626 | 193.542 |
| 3 | Vanilla Flavor | 0.00 | 0.00 | 20.00 | 0.350 | 8.05 | 0.000 | 0.000 | 0.070 | |
| 3 | Cream Flavor | 0.00 | 0.00 | 88.00 | 0.040 | 0.92 | 0.000 | 0.000 | 0.035 | |
| 3 | Vanilla Bean Specks | 10.00 | 5.00 | 95.00 | 0.030 | 0.69 | 0.003 | 0.002 | 0.029 | |
| | | 0.00 | 0.00 | 0.00 | 0.000 | 0.00 | 0.000 | 0.000 | 0.000 | |
| | Totals: | | | | 100.000 | 2300.00 | 1.982 | 20.040 | 39.804 | 235.174 |

Figure 7 - table listing the total separate ingredients and their properties for an exemplary formulation of vanilla yogurt

- Batch Size = 2300

| Ingredients | Raw Ingred. Info | | | Formula Info | | Base Mix Info | | |
|---|---|---|---|---|---|---|---|---|
| | % Fat | % Protein | % T.S. | % By Wt. | LB's/Batch | % Fat | % Protein | % T.S. |
| Water | 0.00 | 0.00 | 0.00 | 46.500 | 1069.50 | 0.000 | 0.000 | 0.000 |
| Culture Addition | 0.53 | 8.11 | 15.05 | 13.580 | 312.34 | 0.071 | 1.101 | 2.044 |
| Cane Sugar | 0.00 | 0.00 | 99.80 | 7.310 | 168.13 | 0.000 | 0.000 | 7.295 |
| Dextrose, Granulated | 0.00 | 0.00 | 99.00 | 2.408 | 55.38 | 0.000 | 0.000 | 2.384 |
| De-oiled Sunflower Lecithin | 80.00 | 1.00 | 95.00 | 0.086 | 1.98 | 0.069 | 0.001 | 0.082 |
| inulin | 0.00 | 0.00 | 90.00 | 3.440 | 79.12 | 0.000 | 0.000 | 3.096 |
| Heavy Cream | 43.5 | 2.6 | 48.2 | 0.688 | 15.82 | 0.299 | 0.018 | 0.332 |
| Skim Milk Powder | 0.65 | 36.00 | 96.00 | 3.268 | 75.16 | 0.021 | 1.176 | 3.137 |
| Whey Protein Isolate | 0.3 | 94.00 | 95.30 | 0.430 | 9.89 | 0.001 | 0.404 | 0.410 |
| Whey Protein Concentrate | 7.00 | 80.00 | 95.50 | 21.672 | 498.46 | 1.517 | 17.338 | 20.697 |
| Trisodium Citrate | 0.00 | 0.00 | 98.00 | 0.086 | 1.98 | 0.000 | 0.000 | 0.084 |
| Sodium Tri-polyphosphate | 0.00 | 0.00 | 98.00 | 0.095 | 2.18 | 0.000 | 0.000 | 0.093 |
| Vanilla Flavor | 0.00 | 0.00 | 20.00 | 0.350 | 8.05 | 0.000 | 0.000 | 0.070 |
| Stevia Extract | 0.00 | 0.00 | 97.00 | 0.017 | 0.40 | 0.000 | 0.000 | 0.017 |
| Cream Flavor | 0.00 | 0.00 | 88.00 | 0.040 | 0.92 | 0.000 | 0.000 | 0.035 |
| Vanilla Bean Specks | 10.00 | 5.00 | 95.00 | 0.030 | 0.69 | 0.003 | 0.002 | 0.029 |
| Totals: | | | | 100.000 | 2300.00 | 1.982 | 20.040 | 39.804 |

Figure 8A - table listing preferred ingredients and their properties for forming an exemplary high-protein dairy base mix specifically for chocolate yogurt

- Batch Size = 1750

| Order | Ingredients | Raw Ingredient Info | | | Formula Info | | Base Mix Info | | | |
|---|---|---|---|---|---|---|---|---|---|---|
| | | % Fat | % Protein | % T.S. | % By Wt. | LB's/ Batch | % Fat | % Protein | % T.S. | Gallons |
| 1 | Water | 0.00 | 0.00 | 0.00 | 53.116 | 929.53 | 0.000 | 0.000 | 0.000 | 111.321 |
| 6 | Heavy Cream | 43.5 | 2.6 | 48.2 | 0.350 | 6.13 | 0.152 | 0.009 | 0.169 | 0.714 |
| 2 | Cane Sugar | 0.00 | 0.00 | 99.80 | 8.500 | 148.75 | 0.000 | 0.000 | 8.483 | |
| 2 | Dextrose, Granulated | 0.00 | 0.00 | 99.00 | 2.800 | 49.00 | 0.000 | 0.000 | 2.772 | |
| 2 | Trisodium Citrate | 0.00 | 0.00 | 98.00 | 0.100 | 1.75 | 0.000 | 0.000 | 0.098 | |
| 2 | Deoiled Sunflower Lecithin | 80.00 | 1.00 | 95.00 | 0.100 | 1.75 | 0.080 | 0.001 | 0.095 | |
| 2 | Sodium Tri-polyphosphate | 0.00 | 0.00 | 98.00 | 0.110 | 1.93 | 0.000 | 0.000 | 0.108 | |
| 2 | Inulin | 0.00 | 0.00 | 90.00 | 3.750 | 65.63 | 0.000 | 0.000 | 3.375 | |
| 2 | Stevia Extract | 0.00 | 0.00 | 97.00 | 0.024 | 0.42 | 0.000 | 0.000 | 0.023 | |
| 7 | Skim Milk Powder | 0.65 | 36.00 | 96.00 | 3.800 | 66.50 | 0.025 | 1.368 | 3.648 | |
| 3 | Cocoa Powder, 10-12 | 11.00 | 18.40 | 95.00 | 2.200 | 38.50 | 0.242 | 0.405 | 2.090 | |
| 5 | Whey Protein Isolate | 0.3 | 94.00 | 95.30 | 0.50 | 8.75 | 0.002 | 0.470 | 0.477 | |
| 4 | Whey Protein Concentrate | 7.00 | 80.00 | 95.50 | 24.650 | 431.38 | 1.726 | 19.720 | 23.541 | |
| | Totals: | | | | 100.000 | 1750.00 | 2.226 | 21.973 | 44.878 | 175.000 |

Figure 8B - table listing preferred proportions of ingredients in an exemplary final mix to produce chocolate yogurt
- Batch Size = 2000

| Order | Ingredients | Ingredient Info | | | Finished Mix Formula | | Finished Mix Info | | | |
|---|---|---|---|---|---|---|---|---|---|---|
| | | % Fat | % Protein | % T.S. | % By Wt. | LB's/Batch | % Fat | % Protein | % T.S. | Gallons |
| 2 | Fermented Culture Blend | 0.53 | 8.11 | 15.05 | 13.660 | 273.20 | 0.072 | 1.108 | 2.056 | 30.238 |
| 1 | Base Mix | 2.23 | 21.97 | 44.88 | 86.000 | 1720.00 | 1.914 | 18.897 | 38.595 | 168.297 |
| 3 | Vanilla Flavor | 0.00 | 0.00 | 20.00 | 0.300 | 6.00 | 0.000 | 0.000 | 0.060 | |
| 3 | Cream Flavor | 0.00 | 0.00 | 88.00 | 0.040 | 0.80 | 0.000 | 0.000 | 0.035 | |
| | | 0.00 | 0.00 | 0.00 | 0.000 | 0.00 | 0.000 | 0.000 | 0.000 | |
| | | 0.00 | 0.00 | 0.00 | 0.000 | 0.00 | 0.000 | 0.000 | 0.000 | |
| | Totals: | | | | 100.000 | 2000.00 | 1.986 | 20.005 | 40.746 | 203.542 |

Figure 9 - table listing preferred proportions of ingredients in an exemplary final mix to produce banana yogurt

- Batch Size = 2300

| Order | Ingredients | Ingredient Info | | | Finished Mix Formula | | Finished Mix Info | | | |
|---|---|---|---|---|---|---|---|---|---|---|
| | | % Fat | % Protein | % T.S. | % By Wt. | LB's/Batch | % Fat | % Protein | % T.S. | Gallons |
| 2 | Fermented Culture Blend | 0.53 | 8.11 | 15.05 | 8.800 | 202.40 | 0.046 | 0.714 | 1.325 | 22.402 |
| 1 | Base Mix | 2.22 | 22.02 | 43.75 | 87.480 | 2012.04 | 1.940 | 19.263 | 38.274 | 196.873 |
| 3 | Vanilla Flavor | 0.00 | 0.00 | 20.00 | 0.350 | 8.05 | 0.000 | 0.000 | 0.070 | |
| 3 | Cream Flavor | 0.00 | 0.00 | 88.00 | 0.040 | 0.92 | 0.000 | 0.000 | 0.035 | |
| 3 | Vanilla Bean Specs | 10.00 | 5.00 | 95.00 | 0.030 | 0.69 | 0.003 | 0.002 | 0.029 | |
| 3 | Banana Puree | 0.00 | 1.00 | 23.00 | 3.000 | 69.00 | 0.000 | 0.030 | 0.690 | |
| 3 | Banana Flavor | 0.00 | 0.00 | 47.00 | 0.300 | 6.90 | 0.000 | 0.000 | 0.141 | |
| | Totals: | | | | 100.000 | 2300.00 | 1.990 | 20.008 | 40.563 | 234.097 |

Figure 10 - table listing preferred proportions of ingredients in an exemplary final mix to produce blueberry-pomegranate yogurt

- Batch Size = 2250

| Order | Ingredients | Ingredient Info | | | Finished Mix Formula | | | Finished Mix Info | | | |
|---|---|---|---|---|---|---|---|---|---|---|---|
| | | % Fat | % Protein | % T.S. | % By Wt. | LB's/Batch | | % Fat | % Protein | % T.S. | Gallons |
| 2 | Fermented Culture Blend | 0.53 | 8.11 | 15.05 | 7.000 | 157.50 | | 0.037 | 0.568 | 1.054 | 17.432 |
| 1 | Base Mix | 2.22 | 22.02 | 43.75 | 88.270 | 1986.08 | | 1.958 | 19.437 | 38.619 | 194.332 |
| 3 | Vanilla Flavor | 0.00 | 0.00 | 20.00 | 0.350 | 7.88 | | 0.000 | 0.000 | 0.070 | |
| 3 | Cream Flavor | 0.00 | 0.00 | 88.00 | 0.040 | 0.90 | | 0.000 | 0.000 | 0.035 | |
| 3 | Blueberry Puree | 0.00 | 0.00 | 26.00 | 1.500 | 33.75 | | 0.000 | 0.000 | 0.390 | |
| 3 | Pomegranate Juice Concentrate | 0.00 | 0.00 | 65.00 | 1.000 | 22.50 | | 0.000 | 0.000 | 0.650 | |
| 3 | Pomegranate Flavor | 0.00 | 0.00 | 50.00 | 0.200 | 4.50 | | 0.000 | 0.000 | 0.100 | |
| 3 | Raspberry Flavor | 0.00 | 0.00 | 31.00 | 0.100 | 2.25 | | 0.000 | 0.000 | 0.031 | |
| 3 | Citric Acid, 50% solution | 0.00 | 0.00 | 50.00 | 0.500 | 11.25 | | 0.000 | 0.000 | 0.250 | |
| 3 | Red Beet Concentrate (Color) | 0.00 | 3.00 | 61.00 | 0.040 | 0.90 | | 0.000 | 0.001 | 0.024 | |
| 3 | Blueberry Juice Concentrate | 0.00 | 0.00 | 50.00 | 1.000 | 22.50 | | 0.000 | 0.000 | 0.500 | |
| | | | | Totals: | 100.000 | 2250.00 | | 1.995 | 20.006 | 41.724 | 227.964 |

Figure 11

PROCESS FOR MAKING HIGH-PROTEIN DAIRY PRODUCT

RELATED APPLICATION INFORMATION

This patent is a continuation of U.S. Ser. No. 14/270,536, filed May 6, 2014, now U.S. Pat. No. 9,040,107, which claims priority from Provisional Patent Application No. 61/897,086, filed Oct. 29, 2013, titled FROZEN, READY TO EAT FOOD.

NOTICE OF COPYRIGHTS AND TRADE DRESS

A portion of the disclosure of this patent document contains material which is subject to copyright protection. This patent document may show and/or describe matter which is or may become trade dress of the owner. The copyright and trade dress owner has no objection to the facsimile reproduction by anyone of the patent disclosure as it appears in the Patent and Trademark Office patent files or records, but otherwise reserves all copyright and trade dress rights whatsoever.

BACKGROUND OF THE INVENTION

The recent popularity and market demand of high-protein foods have encouraged many companies to develop and launch a wide range of products to address this consumer need. When developing dairy-based dessert products, however, formulators encounter rheological and textural limitations during processing that have restricted them from reaching protein levels above 15%. Most attempts fail due to the nature of dairy proteins to gel or precipitate in high moisture systems such as ready to eat desserts or beverages, especially under the high heat conditions associated with the required pasteurization step. In the case of dairy proteins that display resistance to thermal gelling or precipitation, the typical result is a product that sets up like silly putty in a gelled matrix or precipitates and forms an unpleasant sandy or gritty texture. In either case, the products receive poor consumer acceptance and are usually abandoned before they reach the marketplace.

There is thus a need for high-protein yogurt product that has a smooth and rich texture for a pleasant mouth feel.

SUMMARY OF THE INVENTION

The present application describes dairy-based yogurt products and processes for making having protein levels above 15%, sometimes more than 25%, and that have a smooth and rich texture and no grittiness. Careful selection of dairy proteins raises the gelation temperature to avoid causing gelation or precipitation during pasteurization. The starting dairy proteins generally have relatively higher pH levels and low total acidity (TA) levels. Ingredients such as buffering agents and sequestering agents may be utilized to help raise the gelation temperature. Sugars can be used to control hydration of the proteins and therefore also inhibit the tendency of high level diary proteins to gel at higher temperatures. Additionally, pasteurization temperatures, times and methods are selected to avoid gelation or precipitation.

DESCRIPTION OF THE PREFERRED EMBODIMENTS

The present application discloses methods for preparing high protein (>15%) ready to eat food products, including frozen yogurts, that provide a rich and creamy texture with high consumer appeal. The methods described herein are particularly effective in incorporating dairy proteins into such food products without resulting in a gritty or silty texture. Many desirable dairy proteins tend to gel upon heating, such as during pasteurization, and the methods described herein are believed to be the first to successfully utilize high-protein dairy proteins without causing gelation or precipitation. Precipitation causes a gritty or sandy texture while gelation forms a rubbery silly putty texture.

Of course, it should be understood that certain aspects of the methods described herein could be utilized with other proteins to produce food products. For example, proteins derived from canola, soy, bean, pea, and even hemp have been used in food products. However, regulatory bodies such as the FDA in the U.S. typically set minimum standards for dairy proteins in food products that are classed as dairy products, such as yogurt. Therefore, in the context of the present application the term "yogurt" is that food product which meets FDA standards for yogurt. More specifically, before the addition of bulky flavors, yogurt must contain not less than 3.25% milkfat and not less than 8.25% milk solids not fat. (21 U.S.C. §131.200) Lowfat yogurt, before the addition of bulky flavors, must contain not less than 0.5% nor more than 2% milkfat and not less than 8.25% milk solids not fat. (21 U.S.C. §131.203) And nonfat yogurt, before the addition of bulky flavors, contains less than 0.5% milkfat and not less than 8.25% milk solids not fat. (21 U.S.C. §131.206) These minimum levels of dairy solids are easily processed but when the dairy protein levels go higher, e.g., exceeding 15%, such as in high protein dairy products, it becomes more challenging to keep these proteins from gelling or precipitating during the pasteurization process.

For example, frozen yogurt that uses a combination of both a cultured component and a dairy base component is one of the most difficult dairy desert products to make into a high protein product because the culture component must be lower in solids for the cultures to grow. This means that the dairy base must have a correspondingly higher protein content to make up for the lower level in the culture. The present processes are also useful in producing high protein ice cream or dairy desserts.

The following components constitute choices that can be assembled as needed to create a method that can achieve the desired finished product texture while exceeding the 15% protein level. In terms of definition, a product or precursor to the product is "high-protein" if it has a protein level of at least 15%. As the desired protein target level increases above 15%, it is necessary to employ novel component and processing choices to obtain a rich, appealing texture. By employing a suitable combination of the different choices described below, one can create texturally rich products with significantly higher protein levels. Testing of these methods has shown that levels in excess of 25% protein can be formulated while still delivering finished food products, e.g., a snack or dessert, with a rich and appealing texture.

The following principles may be utilized in varying degrees and combinations to result in the desirable dairy products described herein:

1. Selecting proteins that have higher gelation temperatures, yet do not exhibit a gritty texture. Whey protein concentrates or isolates that have pH's above 6.5 and lower TA levels tend to provide the best resistance to heat gelation.

2. Utilizing a suitable combination of proteins. For instance, a small amount of a protein with a higher gelation temperature that has less than ideal texture, such as ones with a slightly "silty" (powdery) texture, with proteins that have a highly desirable texture. Our tests have shown that in some cases these combinations can act synergistically to raise the gelation temperature above the level of the lower gelation temperature protein while still providing a rich texture.

3a. Utilizing sequestering agents such as phosphates like sodium hexametaphosphate or other sequestrants like trisodium citrate that can complex calcium (sometimes termed chelation) and minimize gelling mechanisms such as calcium bridging of proteins.

3b. Utilizing buffering agents such as trisodium citrate or phosphates like disodium phosphate or sodium tripolyphosphate can also help to reduce gelation of milk proteins caused by lower pH.

4. Inhibiting complete hydration of the protein by binding the water with ingredients such as sugars, sugar alcohols, glycerine, etc., that have a significantly higher water binding energy or affinity than the protein. Sugars like fructose or dextrose work especially well.

5. Reducing the necessary processing pasteurization temperatures by extending the pasteurization time; for example, by using vat pasteurization.

6. Splitting up the formulation into two or more steps that are pasteurized separately.

7. Use of phospholipids or phosphorylated proteins or peptides act to raise the thermal gelation temperature of several proteins tested and also softened the resultant gel when it did form.

Each of these steps can be optimized to take advantage of the methods listed herein. The applicants have found that these principles are particularly effective when making high protein fermented frozen yogurts, especially those with more than 20% protein.

Figure 1:
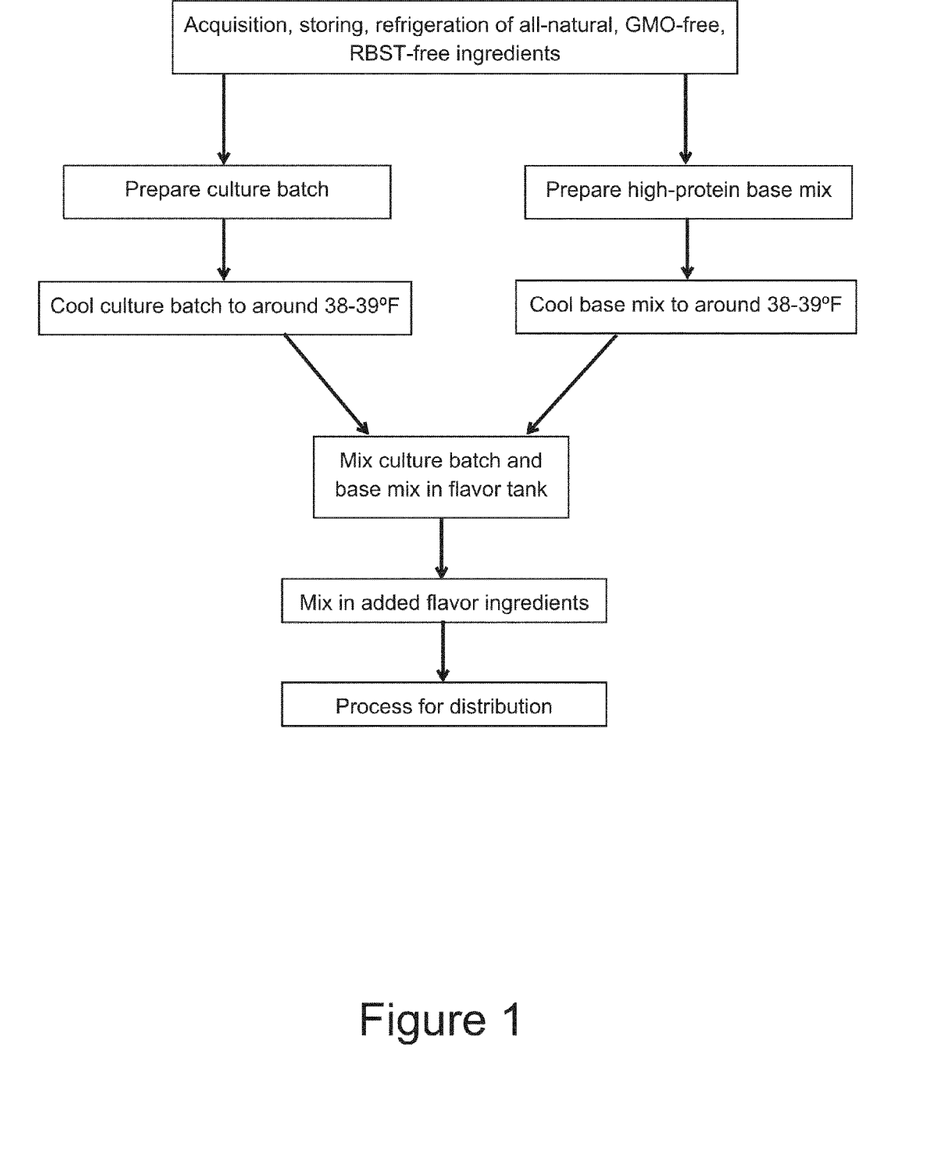
FIG. 1 is a flowchart of an exemplary process for producing the high-protein yogurt.

FIG. 1 is a flowchart of an exemplary process for producing the high-protein yogurt. First of all, the ingredients are acquired, stored and appropriately refrigerated. In a preferred embodiment, all of the ingredients are natural, GMO-free, and RBST-free for marketing to a wider range of consumers. Organic starting ingredients are also preferred.

The production process initially takes two tracks: preparation of a culture batch as described in more detail below with regard to FIG. 2, and preparation of a high-protein base mix as described in more detail with regard to FIG. 4. Both the culture batch and the high-protein base mix are pasteurized and cooled to the same temperature, preferably around 38-39° F., and then mixed in a flavor tank. Additional flavor ingredients are then added to the flavor tank, and a number of ancillary steps performed to prepare the product for distribution. As explained above, the methods described herein are useful for preparing high-protein food products in general, although the illustrated steps are especially suited for preparing high-protein yogurts.

Figure 2:
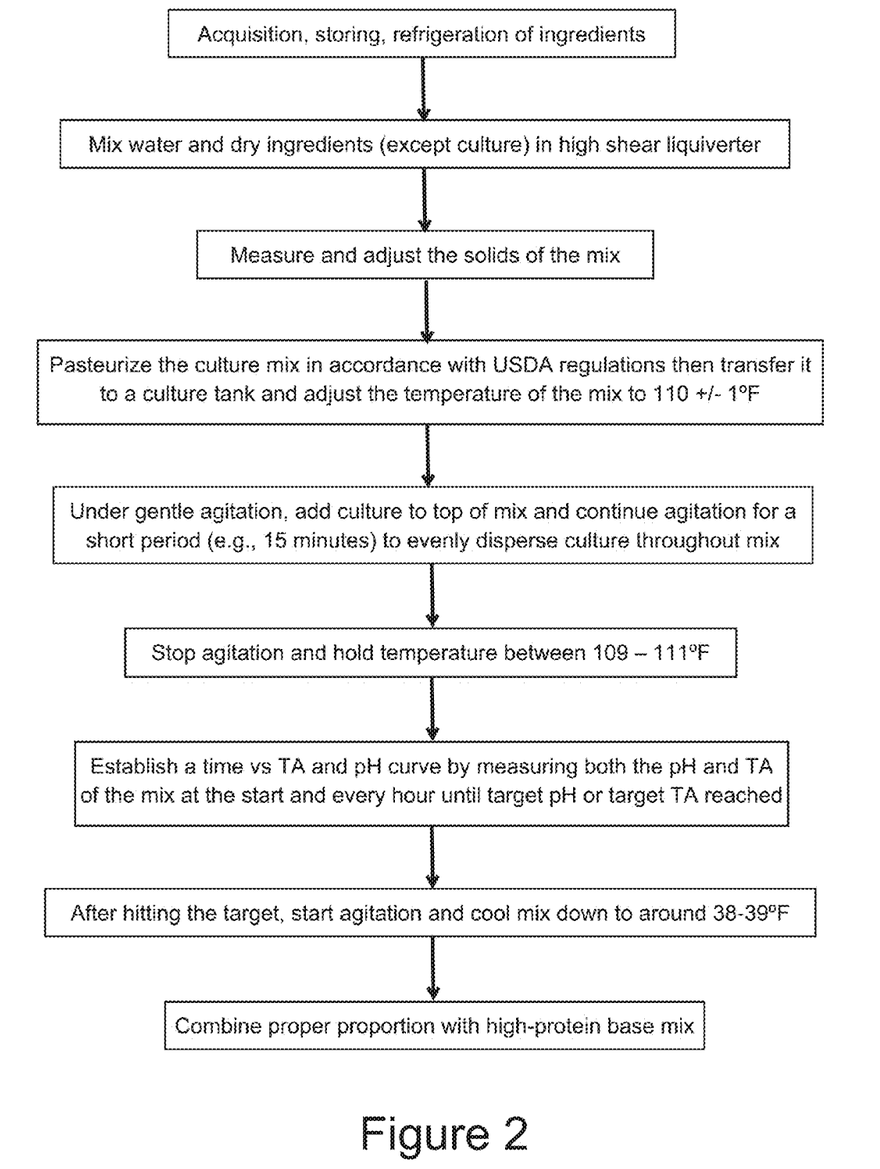
FIG. 2 is a flowchart showing a preferred process for producing a culture batch to subsequently be combined with a high-protein dairy base mix.

FIG. 2 illustrates an exemplary process for producing a culture batch to subsequently be combined with the high-protein dairy base mix. The ingredients of an exemplary culture batch for use in the production of a high-protein vanilla yogurt are given in FIG. 3. Specifically, aside from the culture itself, the dry ingredients include skim milk powder, dextrose, de-oiled sunflower lecithin, a whey protein concentrate, a whey protein isolate, and trisodium citrate.

In a first step, the dry ingredients except the yogurt culture are mixed with water in a high shear liquiverter. High shear mixing conditions may be created using numerous commercial mixing systems, for example, Likwifier, Liquiverter, etc. These mixing conditions may be exemplified by, but are not limited to, a pitch blade turbine operated with an impeller velocity of at least about 1000 ft/min. (900 rpm, 2.54 inch impeller) for a 650 ml batch in a 1.25 liter vessel. Other high shear mixers, mixer blade configurations, high shear roto-stator devices, etc., with a shear rate of least about 45,000 sec$^{-1}$ may also be employed. For instance, a recirculating tri-clover powder horn system works as well.

The initial ingredients are mixed until lump free and uniform. Next, the technician measures and adjusts the percentage of solids in the mix; the target being between 14-16%, with a preferred target of 15.03±0.4%. Next, the ingredients are pasteurized and transferred to a culture tank where the temperature is adjusted to about 110°±1° F. Pasteurization desirably occurs in a water-jacketed pasteurization vat or via a high-temperature short-time (HTST) system at a minimum temperature of about 177° F. The pasteurized ingredients are then gently agitated and the culture added (inoculation) to the top thereof following directions provided by the culture manufacturer. Agitation is continued for a short period, for example 15 minutes, to evenly disperse the culture through the mix. Prior to the next step, agitation is halted while the temperature is maintained at about 110°±1° F.

Over a period of time, such as 5 hours, the technician then periodically measures the total acidity (TA) and pH of the culture batch. Total acidity (TA) is measured by a titration method, where the concentration of acid in a liquid is determined by slowly adding a small amount of a base until a change in color occurs due to the presence of an added indicator. For example, the TA and pH are measured at the beginning and at every hour to establish a curve for both parameters over time. The process continues until desired measures of TA and pH are reached.

The target pH is acidic, below 7, preferably less than about 6.5, and in one exemplary embodiment the process continues until the pH is about 4.9±0.05. An acidic pH slows culture growth, and the acids generated by the desirable culture tend to inhibit growth of potential contaminating micro-organisms. As the culture ferments, the proteins open up and provide additional stability and viscosity to the culture. Consequently, the addition of stabilizers such as gums and emulsifiers is not required. At the same time, the target TA is less than 1.5, and more preferably the target TA is about 1.0±0.1.

After hitting the pH and TA targets, the technician starts agitating the culture batch and cools the batch down to about 38-39° F. This "breaks" the culture at the target parameters, or in other words stops the growth of the culture and the production of additional acid. At this point, the culture batch is ready to be combined with the high-protein base mix, which will be described below.

Figure 4:
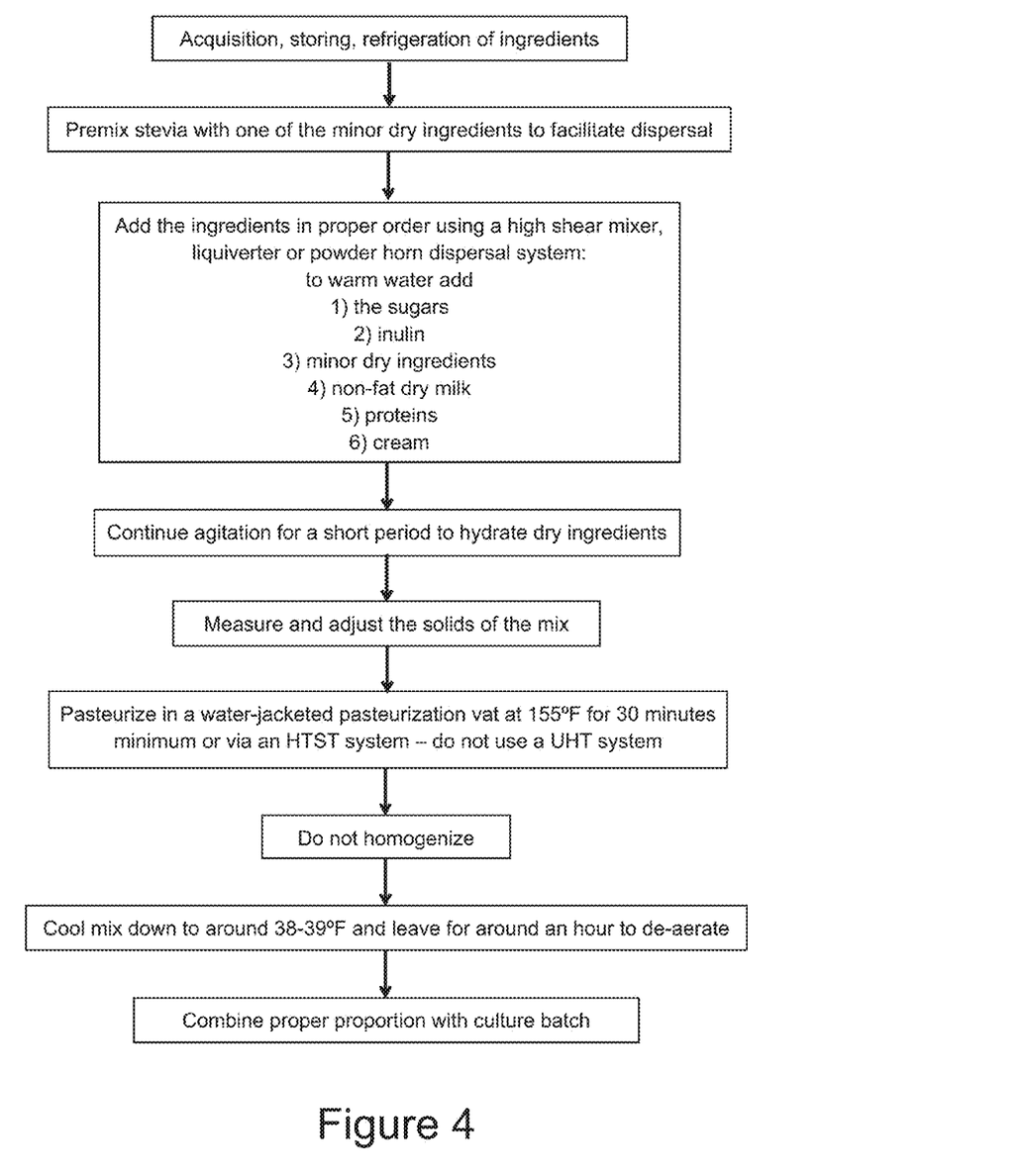
FIG. 4 is a flowchart of an exemplary process for producing a high-protein dairy base mix for vanilla yogurt to be combined with the culture batch.
Figure 5:
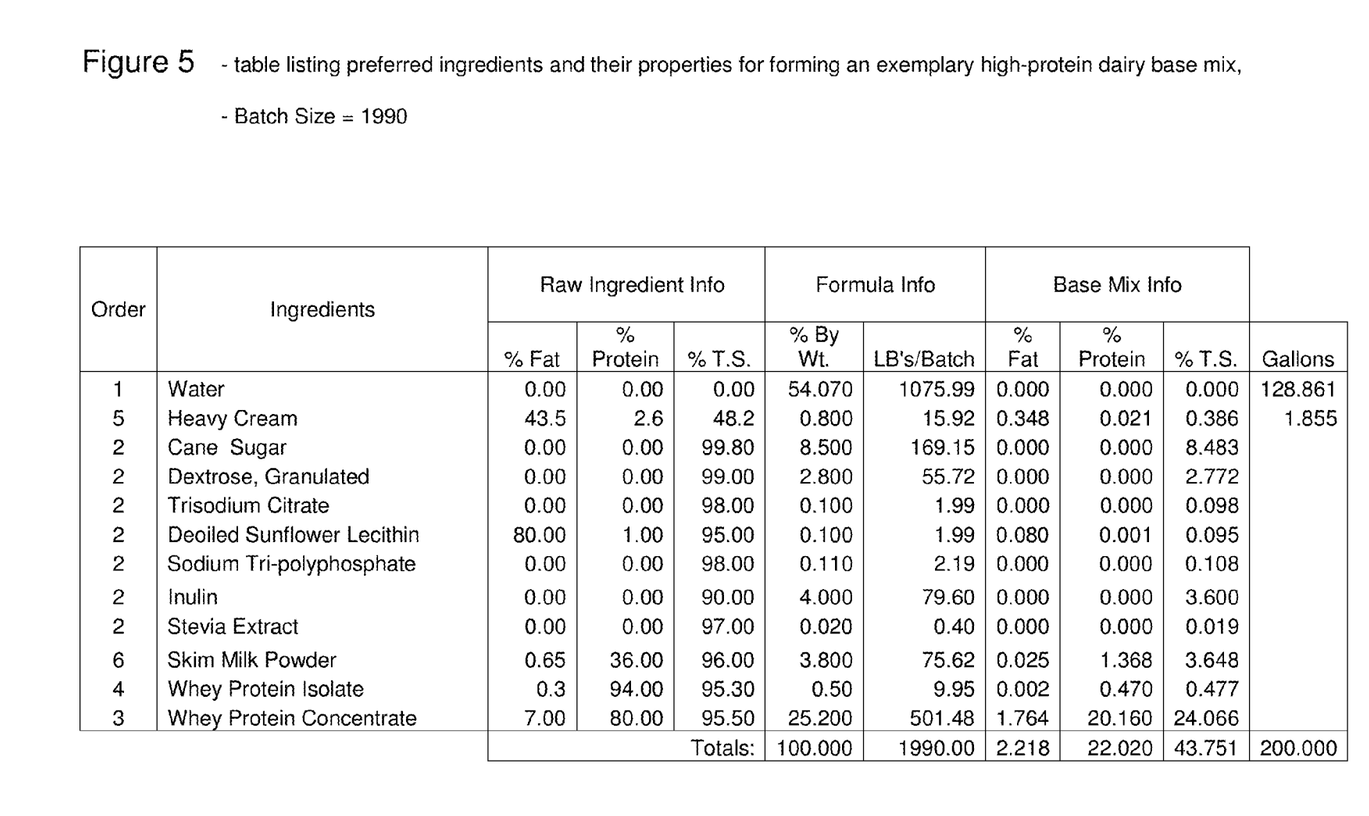
FIG. 5 is a table listing preferred ingredients and their properties for forming an exemplary high-protein dairy base mix.

The flowchart of FIG. 4 illustrates an exemplary process for producing the high-protein dairy base mix for vanilla yogurt to be combined with the culture batch, while FIG. 5 lists preferred ingredients and their properties for forming the base mix. The main ingredients of the base mix are water, a whey protein concentrate, skim milk powder and sweeteners including cane sugar, inulin and dextrose. Insulins are a group of naturally occurring polysaccharides that function as a prebiotic fiber and are produced by many types of plants, most often extracted from chicory. Less prevalent in the base mix is heavy cream, a whey protein isolate and Stevia extract.

Several ingredients in the base mix are included to reduce the propensity of the proteins in the mix to gel. In particular, the base mix preferably includes one or more buffering and/or sequestering agents that essentially increase the gelation temperature of whey proteins. For instance, the process desirably includes a sequestering agent such as sodium hexametaphosphate or trisodium citrate, which complexes calcium and minimizes its potential to react with proteins which can cause gelation. It should be noted that natural ingredients such as trisodium citrate are preferred by the targeted consumer group. Likewise, a buffering agent such as trisodium citrate or sodium tri-polyphosphate can help stabilize pH when acid levels increase which also reduces the propensity for protein gelation or precipitation. In this way, a protein may be used that would normally gel at the temperatures used for pasteurization, and would otherwise produce an unsatisfactory texture in the yogurt (at the extreme, like the texture of silly putty if gelled or a coarse sand if precipitated). It should be noted that sugars such as sucrose and dextrose will bind with water and thus retard protein hydration which also reduces its ability to gel. However, for dietary reasons the amount of cane sugar may be limited in the exemplary formulation (8.5% by weight of the base mix in FIG. 5) and its sweetness replaced by the addition of another sweetener such as Stevia. Additionally, the amount of cane sugar in the overall dairy food product is reduced by mixing with the lower sugar containing culture (e.g., the sugar may be limited to no more than 7.5% by weight, such as in FIG. 7 which shows an example of 7.310%).

Furthermore, a particular dairy protein that starts out with relatively high gelation temperatures as well as smooth textures may be combined with a small amount of another dairy protein that has even higher gelation temperatures but a somewhat less than smooth texture to further retard gelation. For example, the exemplary base mix ingredients provided in FIG. 5 includes a whey protein concentrate with a desirable texture in a 50:1 ratio by weight to a whey protein isolate with a less desirable texture. In a preferred embodiment, proteins which have a starting pH of greater than 6.5 and the total acidity (TA) of less than 0.3 are used, preferably less than 0.25, and perhaps down as low as 0.20-0.22. Exemplary proteins may be mixed with de-ionized water at a 10% protein level and tested for these properties, and various combinations of proteins can also be heat tested to find a desirable synergistic match.

With reference again to FIG. 5, the process for making the base mix again begins by proper acquisition, storage, and refrigeration of the ingredients. Prior to mixing most of the ingredients together, the technician will premix Stevia with one of the "minor" dry ingredients (e.g., inulin) to facilitate dispersal throughout the final mix. Next, each of the ingredients is added to cold or warm water in proper order in a high shear mixer, recirculating liquiverter, or powder horn dispersal system. The ingredients are agitated for a short period (e.g., 10 minutes) until the mix is lump free and uniform, and the dry ingredients are hydrated.

Next, the technician measures and adjusts the solids of the mix to a target of between 30-60%, with a preferred target in our example of 43.75±1.0%. The adjusted mix is then pasteurized in a water-jacketed pasteurization vat at a minimum temperature of about 155° F. for a period of no less than 30 minutes. As with the culture batch, an HTST system may also be used, but an ultrahigh temperature (UHT) pasteurization technique should not be used so as not to unduly increase the temperature and cause gelation. Homogenization should not be part of the process. Finally, after pasteurization the mix is cooled down to about 35-39° F., more preferably 38-39° F., and left for about an hour to de-aerate. The base mix is then ready for combining with the culture batch, as was described above with respect to FIG. 1.

Figure 6:
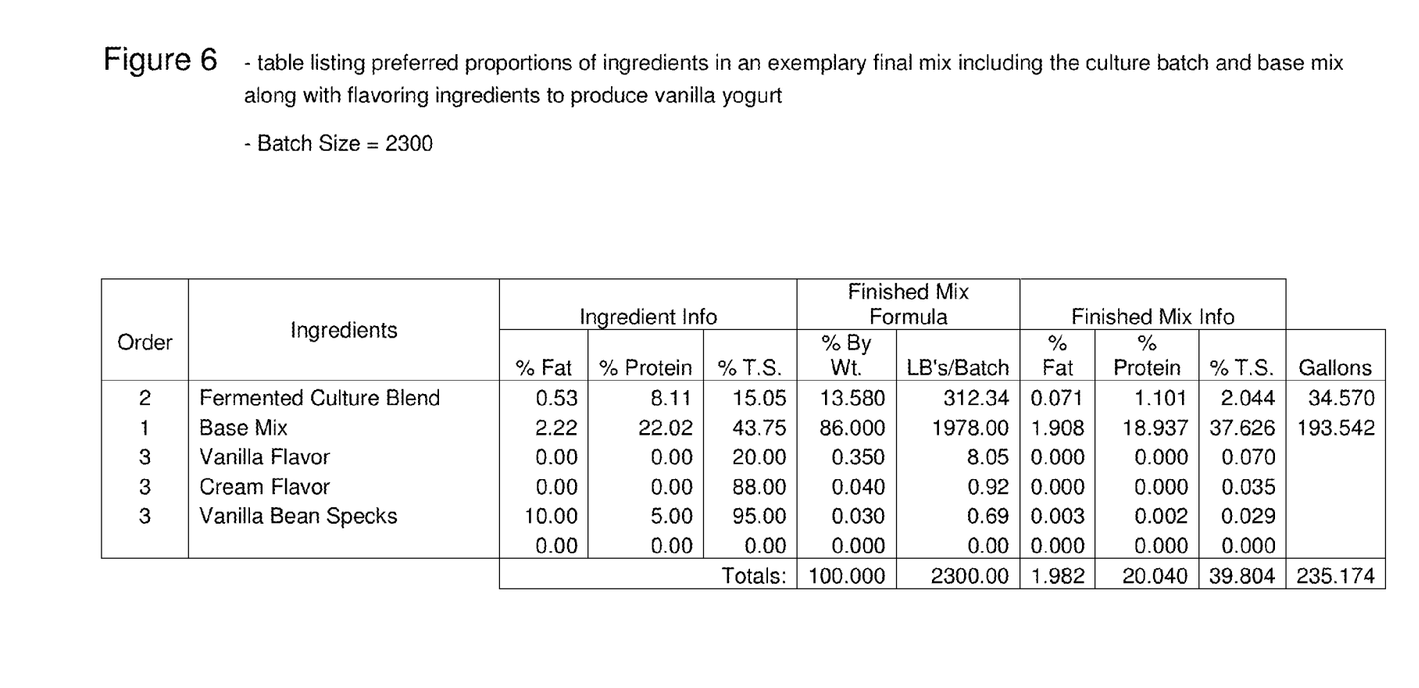
FIG. 6 is a table listing preferred proportions of ingredients in an exemplary final mix including the culture batch and base mix along with flavoring ingredients to produce vanilla yogurt.

FIG. 6 is a table listing preferred proportions of ingredients in an exemplary final mix including the culture batch and base mix along with flavoring ingredients to produce vanilla yogurt. In the exemplary formulation, 86% by weight of the finished mix is the base mix, while about 13.6% is the culture batch, with the rest of the ingredients comprising vanilla flavoring as shown. The finished mix is agitated for at least 10 minutes minimum to assure even distribution of the flavoring ingredients. Measurement of the product solids and density should be done for quality control. In this example, the targeted finished product density is 0.888 g/ml with a range of ±0.042 g's/ml. This is equivalent to 26.26 g/fl. oz. (±1.25 g's/fl. oz.), 210.1 g/cup, or 7.41 lbs/gallon.

Figure 3:
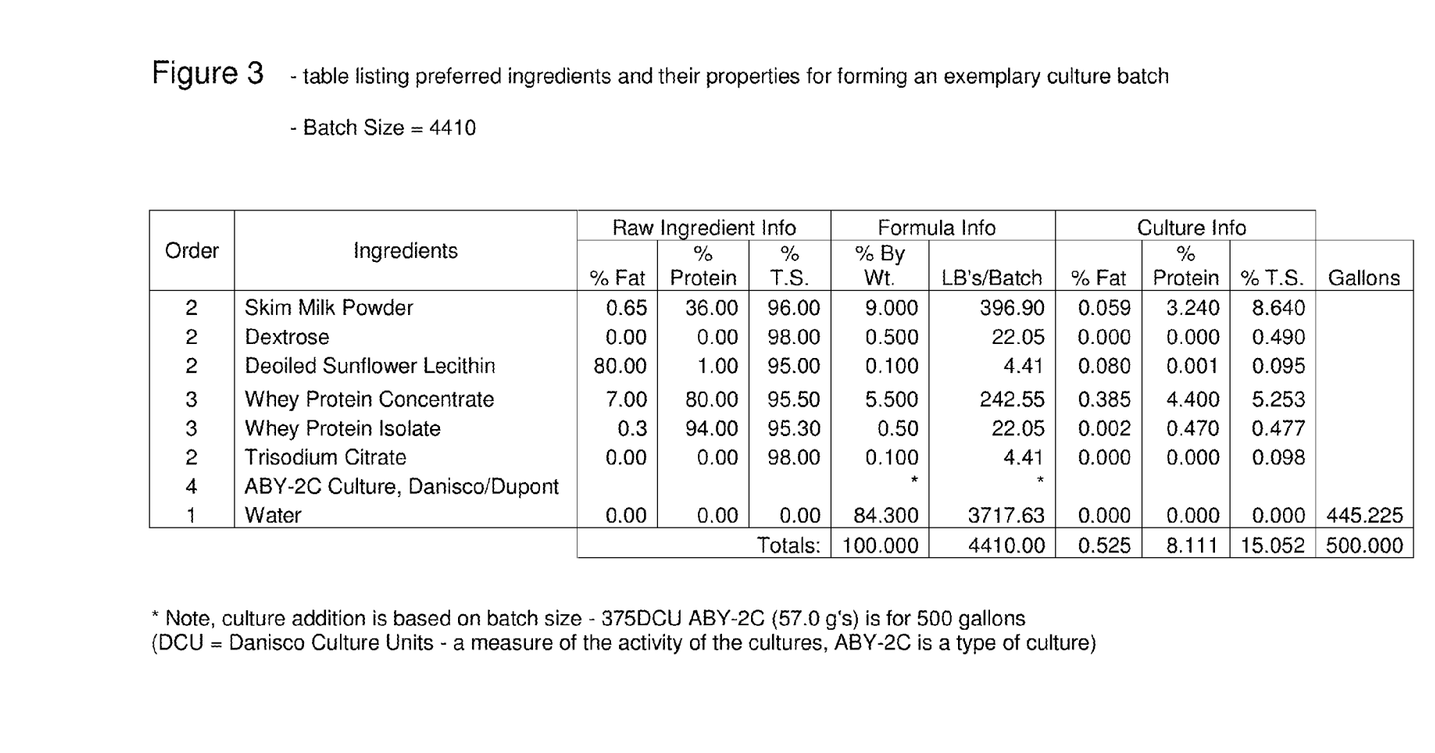
FIG. 3 is a table listing preferred ingredients and their properties for forming an exemplary culture batch.
Figure 7:
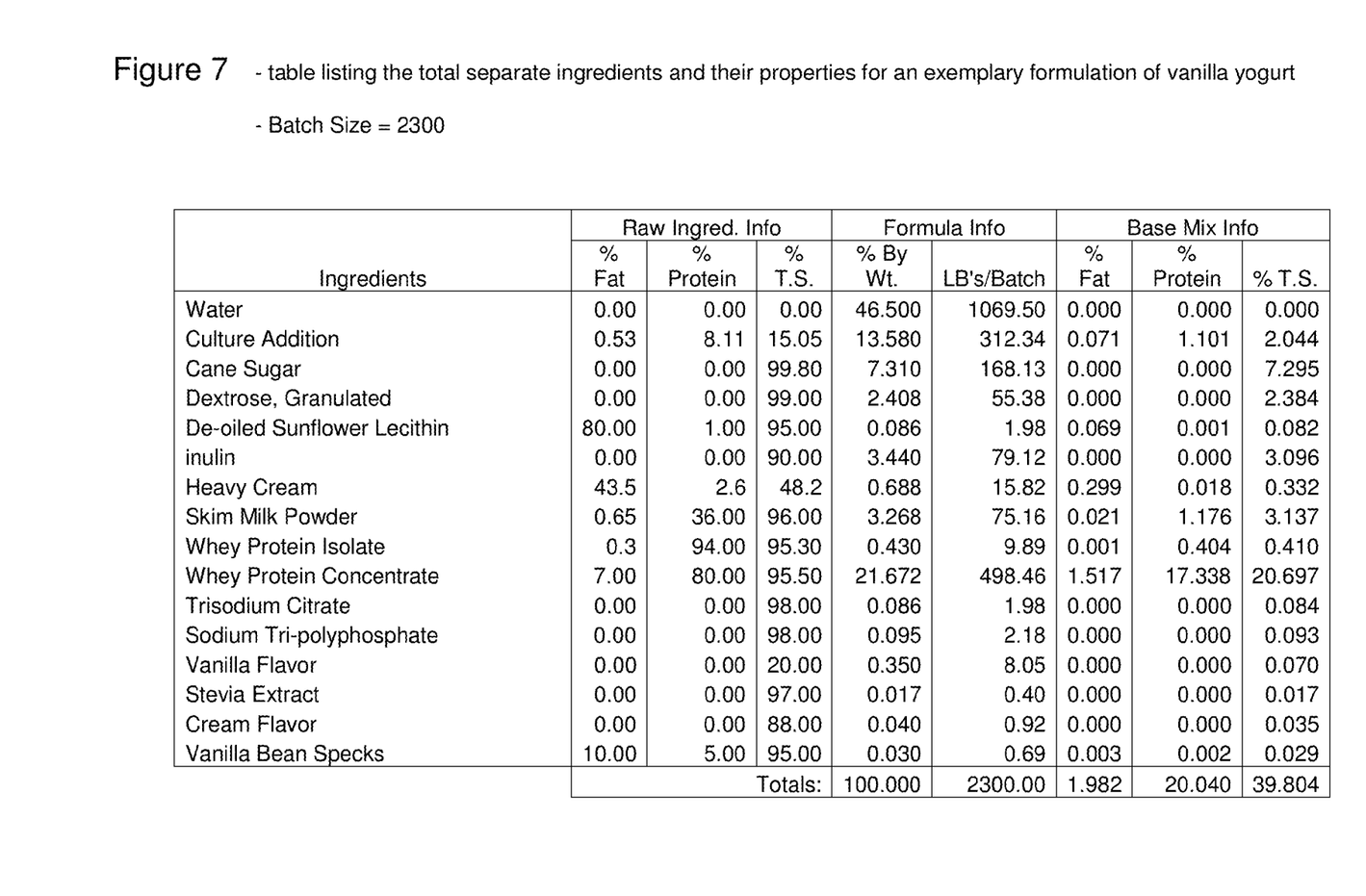
FIG. 7 is a table listing the total separate ingredients and their properties for an exemplary formulation of vanilla yogurt.

FIG. 7 lists the total separate ingredients and their properties for the vanilla yogurt formed in the process using the ingredients of FIGS. 3, 5, and 6. As is apparent, the largest ingredients by weight are water, the whey protein concentrate, the culture batch, and various sweeteners. The final protein level is around 20%, and the level of total solids (TS) is around 40%.

Figure 8A:
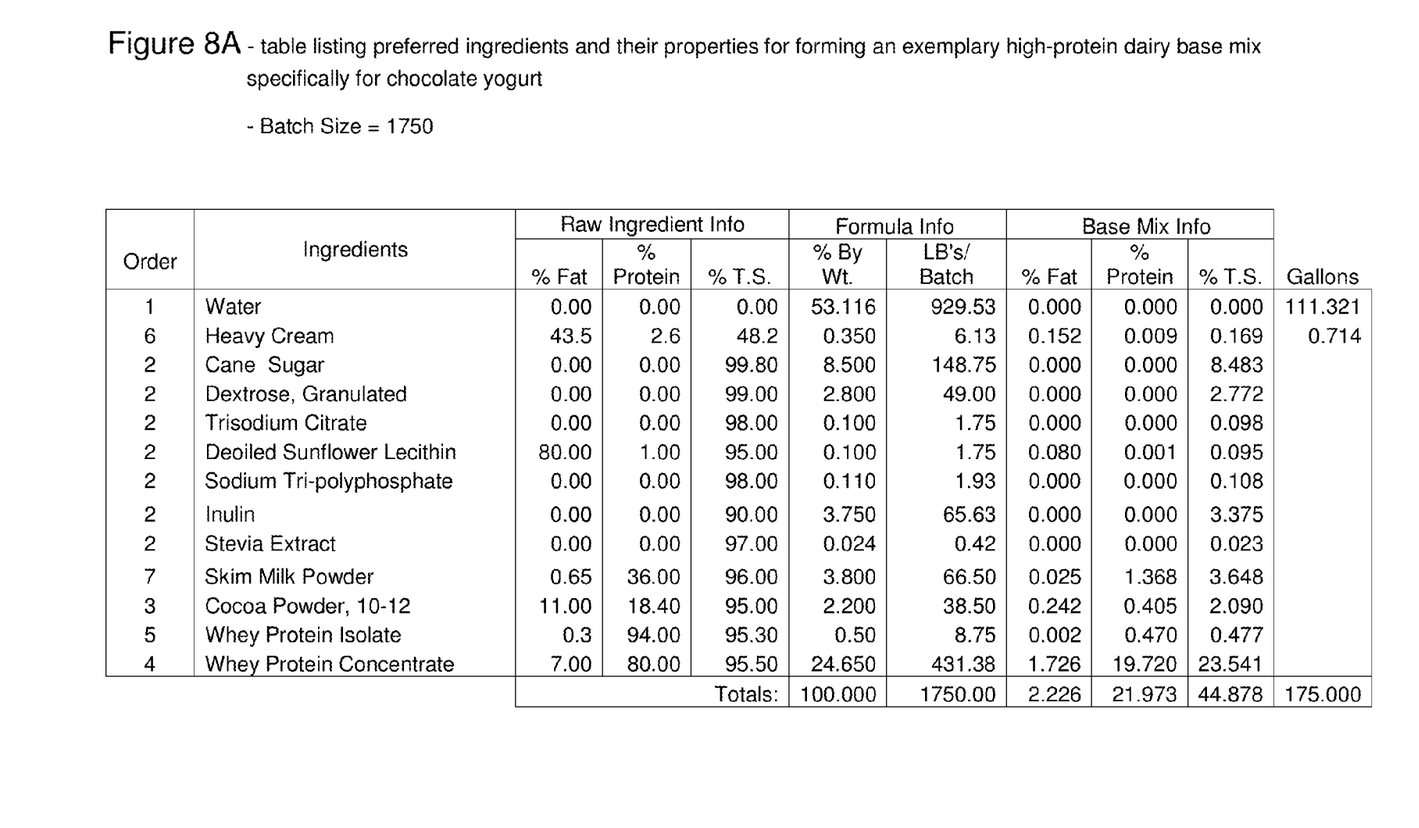
FIG. 8A is a table listing preferred ingredients and their properties for forming an exemplary high-protein dairy base mix specifically for chocolate yogurt.
Figure 8B:
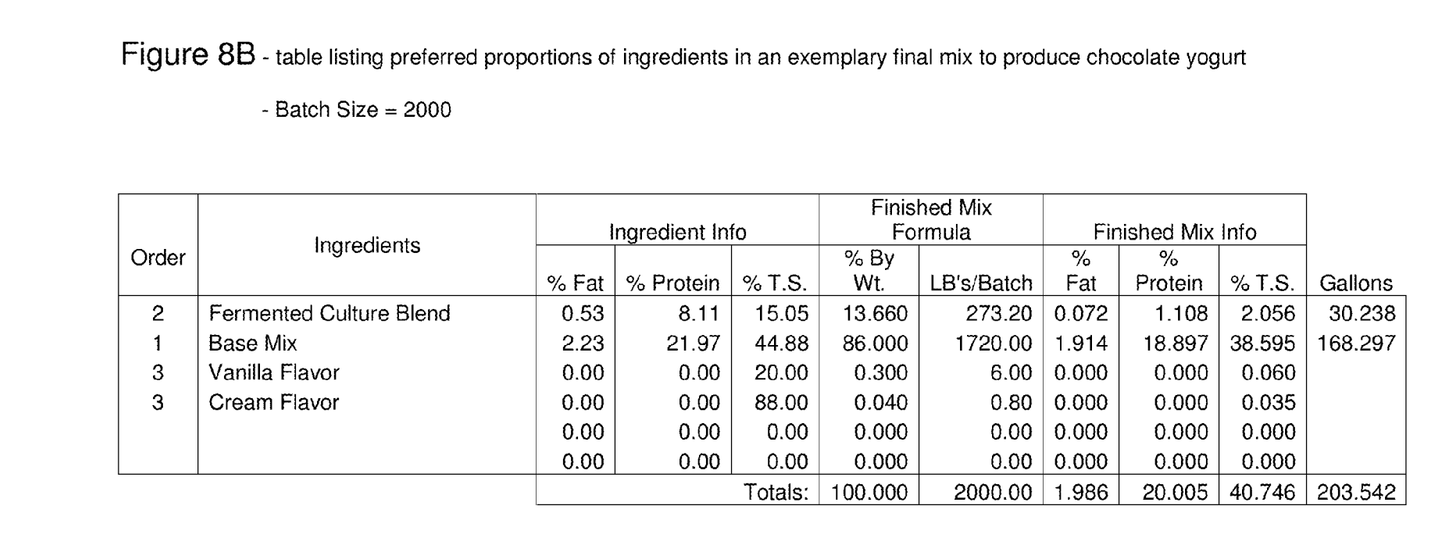
FIG. 8B is a table listing preferred proportions of ingredients in an exemplary final mix to produce chocolate yogurt.

FIG. 8A lists preferred ingredients and their proportions for forming a high-protein dairy base mix specifically for chocolate yogurt, while FIG. 8B shows the preferred proportions of ingredients in an exemplary final mix to produce the chocolate yogurt. The formula is much like that for vanilla, but cocoa powder is added to the base mix. Further, vanilla bean specks are not added to the final mix.

Figure 9:
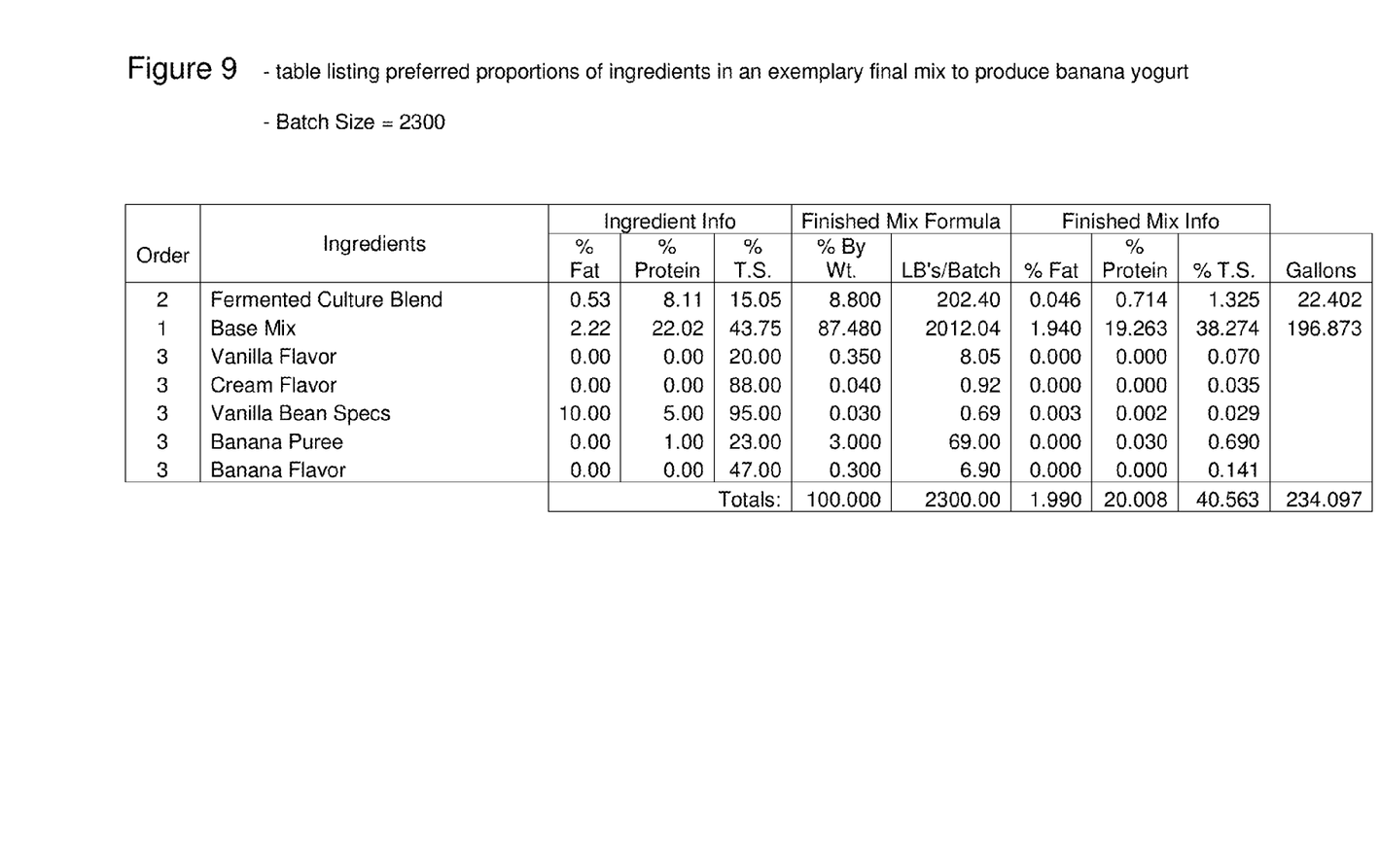
FIG. 9 is a table listing preferred proportions of ingredients in an exemplary final mix to produce banana yogurt.

FIG. 9 is a table listing preferred proportions of ingredients in an exemplary final mix to produce banana yogurt. In this formulation, vanilla bean specks are still added as well as banana purée and banana flavor of about 3% by weight.

Figure 10:
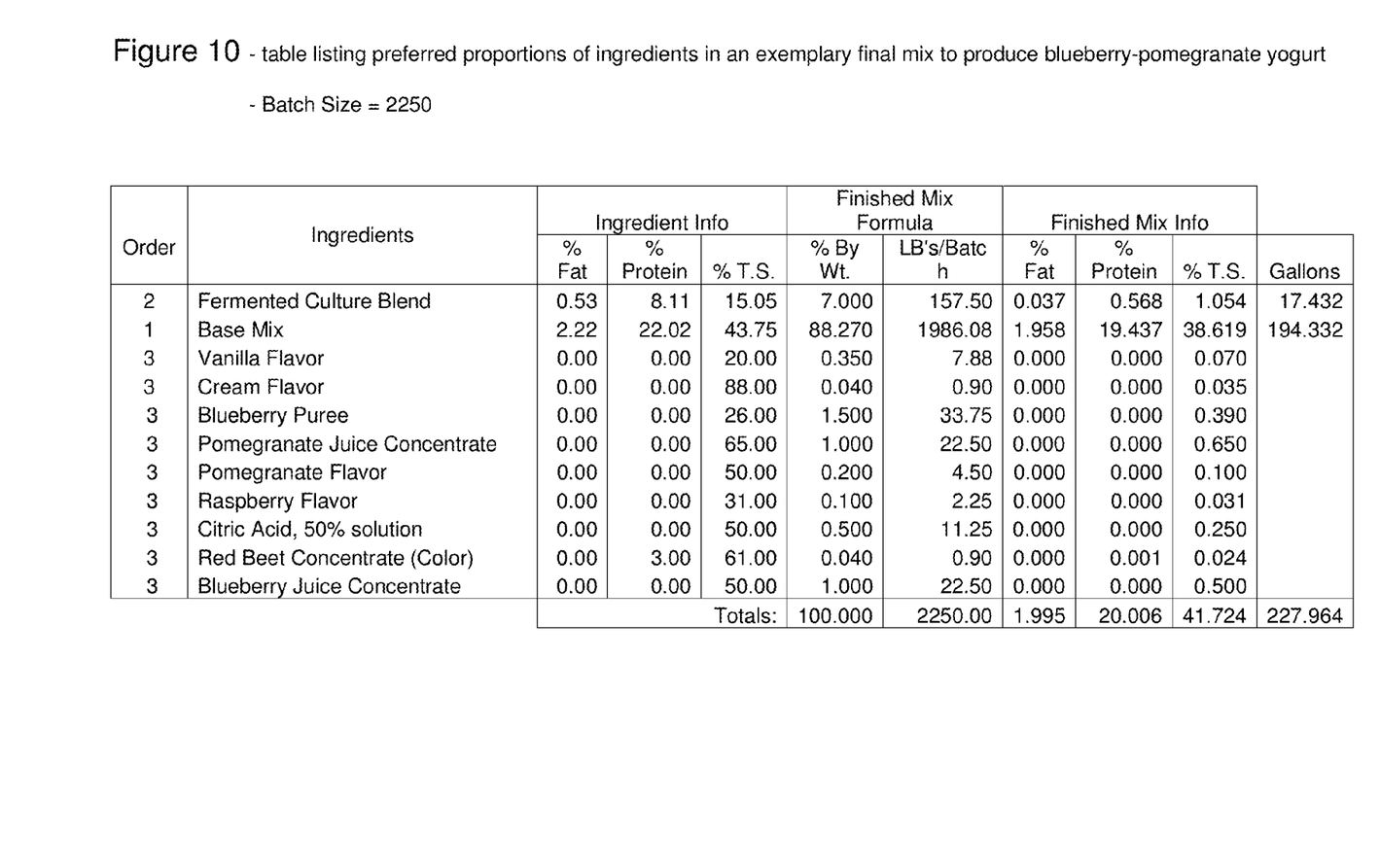
FIG. 10 is a table listing preferred proportions of ingredients in an exemplary final mix to produce blueberry-pomegranate yogurt.

FIG. 10 lists preferred proportions of ingredients in an exemplary final mix to produce blueberry-pomegranate yogurt. Instead of vanilla bean specks, a number of fruit additives are included as well as red beet concentrate to provide deeper red color.

Figure 11:
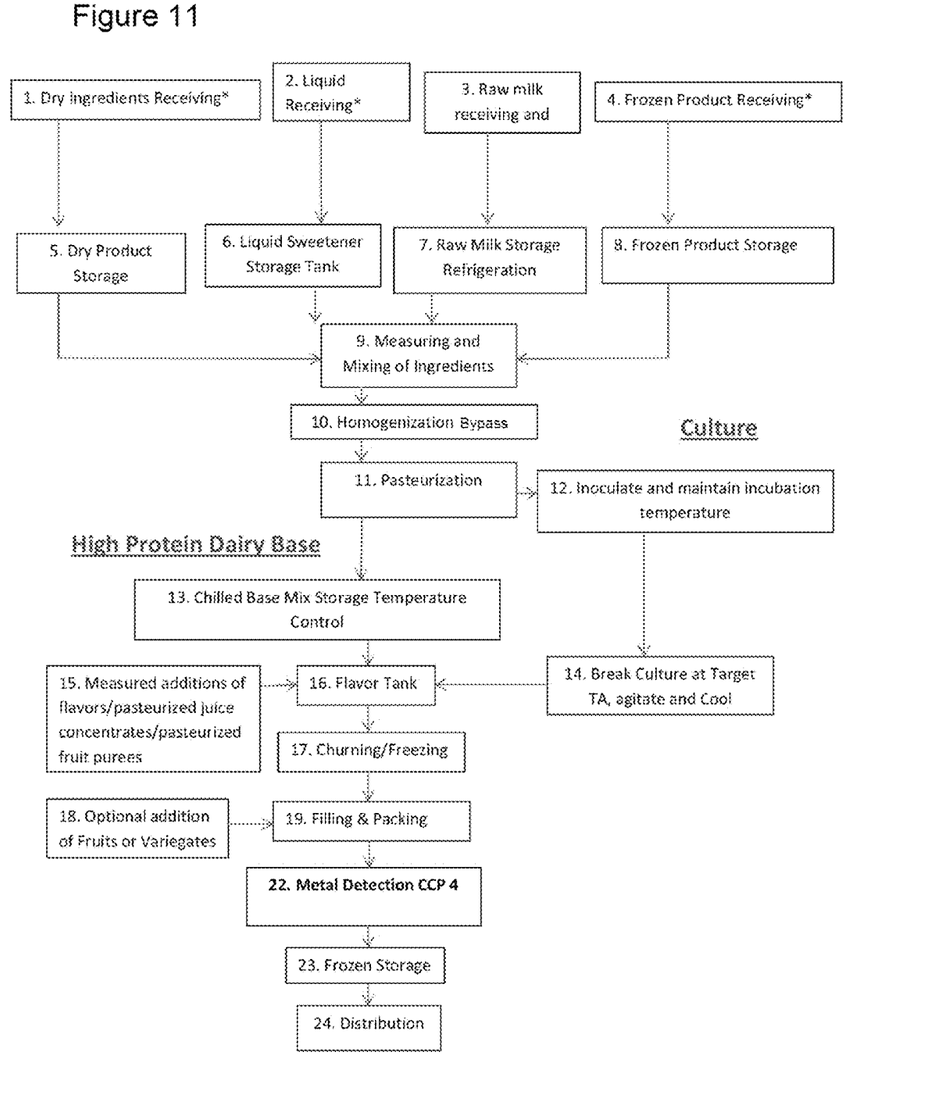
FIG. 11 is a flowchart of a number of preliminary and finishing steps that are typically performed when producing the exemplary high-protein yogurt.

FIG. 11 is a flowchart of a number of preliminary and finishing steps that are typically performed when producing the exemplary high-protein yogurt. Namely, the separate steps of receiving and storing the various ingredients are indicated toward the top of flowchart prior to mixing to form the culture batch and the high-protein base mix. Once the two components have been properly mixed and cooled, they may be passed through an auger-type chiller which converts the flavored mix into a frozen yogurt. Optionally, fresh fruits or other ingredients may be added at this point prior to filling and packing the product into containers. An additional requirement is to scan for bits of metal as a precautionary quality control measure. Finally, the product is stored in freezers and ultimately distributed to the wholesale and retail establishments.

Throughout this description, the embodiments and examples shown should be considered as exemplars, rather than limitations on the apparatus and procedures disclosed or claimed. Although many of the examples presented herein involve specific combinations of method acts or system elements, it should be understood that those acts and those elements may be combined in other ways to accomplish the same objectives. With regard to flowcharts, additional and fewer steps may be taken, and the steps as shown may be combined or further refined to achieve the methods described herein. Acts, elements and features discussed only in connection with one embodiment are not intended to be excluded from a similar role in other embodiments.

What is claimed is:

1. A process of preparing a high-protein dairy food product, comprising:
   preparing a culture batch including mixing in liquid a first dairy protein to disperse and hydrate the first dairy protein;
   forming a culture mix by adding to the culture batch at least one ingredient that retards gelation or precipitation of the first dairy protein at higher temperatures;
   pasteurizing the culture mix;
   inoculating the pasteurized culture mix with a culture;
   holding the inoculated culture mix at an elevated temperature for a period of time sufficient to grow the culture;
   stopping the culture growth in the inoculated culture mix;
   preparing a high-protein base mix including mixing in liquid a second dairy protein to disperse and hydrate the first dairy protein, the base mix further including at least one dry ingredient that retards gelation of the second dairy protein at higher temperatures;
   pasteurizing but not homogenizing the base mix;
   cooling the base mix; and
   mixing the culture mix and the high-protein base mix and adding flavor ingredients to produce a dairy food product with at least 15% dairy protein content.

2. The method of claim 1, wherein the culture batch includes either or both a sequestering agent and a buffering agent, and the high-protein base mix includes either or both a sequestering agent and a buffering agent.

3. The method of claim 2, wherein both the culture batch and the high-protein base mix include a sequestering agent.

4. The method of claim 1, wherein the first dairy protein includes a whey protein isolate and a whey protein concentrate.

5. The method of claim 1, wherein the dairy food product is yogurt.

6. The method of claim 1, wherein the inoculated culture mix is held at an elevated temperature for a period of time until a target pH of less than about 6.5 and/or target total acidity of less than about 1.5 is reached, after which the culture mix is cooled.

7. The method of claim 1, wherein the first dairy protein and the second dairy protein have respective gelation temperatures, and the gelation temperature of one of the two dairy proteins is higher than the gelation temperature of the other.

8. The method of claim 7, wherein the dairy protein with the higher gelation temperature is a whey protein isolate, and the other dairy protein is a whey protein concentrate.

9. The method of claim 1, wherein at least one of first dairy protein and the second dairy protein has a total acidity of less than 0.25.

10. The method of claim 1, wherein at least one of first dairy protein and the second dairy protein has a pH of greater than 6.5 and a total acidity of less than 0.3.

11. The method of claim 1, wherein the inoculated culture mix is held at an elevated temperature for a period of time until a target pH and a target total acidity is reached.

12. The method of claim 11, wherein the target pH is less than about 6.5 and the target total acidity is less than about 1.5.

13. The method of claim 1, wherein the step of cooling the base mix comprises cooling the base mix to a temperature of about 35-39° F.

14. The method of claim 1, wherein the dairy food product has 15-25% dairy protein content.

15. A method of preparing a high-protein food product, comprising:
   preparing a culture batch including mixing in liquid a first protein to disperse and hydrate the first protein;
   forming a culture mix by adding to the culture batch at least one first ingredient that retards gelation or precipitation of the first protein at higher temperatures, the first ingredient including a sequestering agent that complexes with calcium and/or a buffering agent that minimizes fluctuations in pH of the culture mix;
   pasteurizing the culture mix;
   inoculating the pasteurized culture mix with a culture;
   holding the inoculated culture mix at an elevated temperature for a period of time sufficient to grow the culture;
   stopping the culture growth in the inoculated culture mix;
   preparing a high-protein base mix including mixing in liquid a second protein to disperse and hydrate the second protein, the base mix further including at least one second ingredient that retards gelation of the second protein at higher temperatures, the second ingredient including a sequestering agent that complexes with calcium and/or a buffering agent that minimizes fluctuations in pH of the base mix;
   pasteurizing but not homogenizing the base mix;
   cooling the base mix; and
   mixing the culture mix and the high-protein base mix and adding flavor ingredients to produce a food product with at least 15% protein content.

16. The method of claim 15, wherein the first protein is a dairy protein and the second protein is a dairy protein.

17. The method of claim 16, wherein the first dairy protein and the second dairy protein have respective gelation temperatures, and the gelation temperature of one of the two dairy proteins is higher than the gelation temperature of the other.

18. The method of claim 17, wherein the dairy protein with the higher gelation temperature is a whey protein isolate, and the other dairy protein is a whey protein concentrate.

19. The method of claim 15, wherein at least one of first protein and the second protein has a pH of greater than 6.5 and a total acidity of less than 0.3.

20. The method of claim 15, wherein the culture batch includes both a sequestering agent and a buffering agent, and the high-protein base mix includes both a sequestering agent and a buffering agent.

21. The method of claim 15, wherein the sequestering agent in at least one of the culture batch or the high-protein base mix is sodium tri-polyphosphate.

22. The method of claim 15, wherein the sequestering agent in at least one of the culture batch or the high-protein base mix is a phospholipid or phosphorylated protein or peptide.

23. The method of claim 15, wherein the sequestering agent in at least one of the culture batch or the high-protein base mix is trisodium citrate.

24. A method of preparing a high-protein dairy food product, comprising:
    preparing a culture batch including mixing in liquid a first dairy protein having a pH of greater than 6.5 and a total acidity of less than 0.3 to disperse and hydrate the first dairy protein;
    forming a culture mix by adding to the culture batch at least one first ingredient that retards gelation or precipitation of the first protein at higher temperatures, the first ingredient including a sequestering agent that complexes with calcium and/or a buffering agent that minimizes fluctuations in pH of the culture mix;
    pasteurizing the culture mix;
    inoculating the pasteurized culture mix with a culture;
    holding the inoculated culture mix at an elevated temperature for a period of time sufficient to grow the culture;
    stopping the culture growth in the inoculated culture mix;
    preparing a high-protein base mix including mixing in liquid a second dairy protein having a pH of greater than 6.5 and a total acidity of less than 0.3 to disperse and hydrate the second dairy protein, the base mix further including at least one second ingredient that retards gelation of the second protein at higher temperatures, the second ingredient including a sequestering agent that complexes with calcium and/or a buffering agent that minimizes fluctuations in pH of the base mix;
    pasteurizing but not homogenizing the base mix;
    cooling the base mix; and
    mixing the culture mix and the high-protein base mix and adding flavor ingredients to produce a dairy food product with at least 15% dairy protein content.

25. The method of claim 24, wherein the culture batch includes both a sequestering agent and a buffering agent, and the high-protein base mix includes both a sequestering agent and a buffering agent.

26. The method of claim 24, wherein the inoculated culture mix is held at an elevated temperature for a period of time until reaching a target pH of less than about 6.5 and a target total acidity less than about 1.5.

27. A method of preparing a high-protein dairy food product, comprising:
    preparing a culture batch including mixing in liquid a first dairy protein having a pH of greater than 6.5 and a total acidity of less than 0.3 to disperse and hydrate the first dairy protein;
    forming a culture mix by adding to the culture batch at least one first ingredient that retards gelation or precipitation of the first protein at higher temperatures;
    pasteurizing the culture mix;
    inoculating the pasteurized culture mix with a culture;
    holding the inoculated culture mix at an elevated temperature for a period of time sufficient to grow the culture;
    stopping the culture growth in the inoculated culture mix;
    preparing a high-protein base mix including mixing in liquid a second dairy protein having a pH of greater than 6.5 and a total acidity of less than 0.3 to disperse and hydrate the second dairy protein, the base mix further including at least one second ingredient that retards gelation of the second protein at higher temperatures, wherein the first dairy protein and the second dairy protein have respective gelation temperatures, and the gelation temperature of one of the two dairy proteins is higher than the gelation temperature of the other;
    pasteurizing but not homogenizing the base mix;
    cooling the base mix; and
    mixing the culture mix and the high-protein base mix and adding flavor ingredients to produce a dairy food product with at least 15% dairy protein content.

28. The method of claim 27, wherein the dairy protein with the higher gelation temperature is a whey protein isolate, and the other dairy protein is a whey protein concentrate.

29. The method of claim 27, wherein the first and second ingredients each include a sequestering agent that complexes with calcium and/or a buffering agent that minimizes fluctuations in pH of the culture mix.

30. The method of claim 27, wherein the inoculated culture mix is held at an elevated temperature for a period of time until reaching a target pH of less than about 6.5 and a target total acidity less than about 1.5.

\* \* \* \* \*